C. S. WRIGHT.
WIRE ROPE CLAMP.
APPLICATION FILED APR. 27, 1917.

1,251,723.

Patented Jan. 1, 1918.
2 SHEETS—SHEET 1.

WITNESS

INVENTOR.
C. S. Wright
by F. N. Barber
attorney

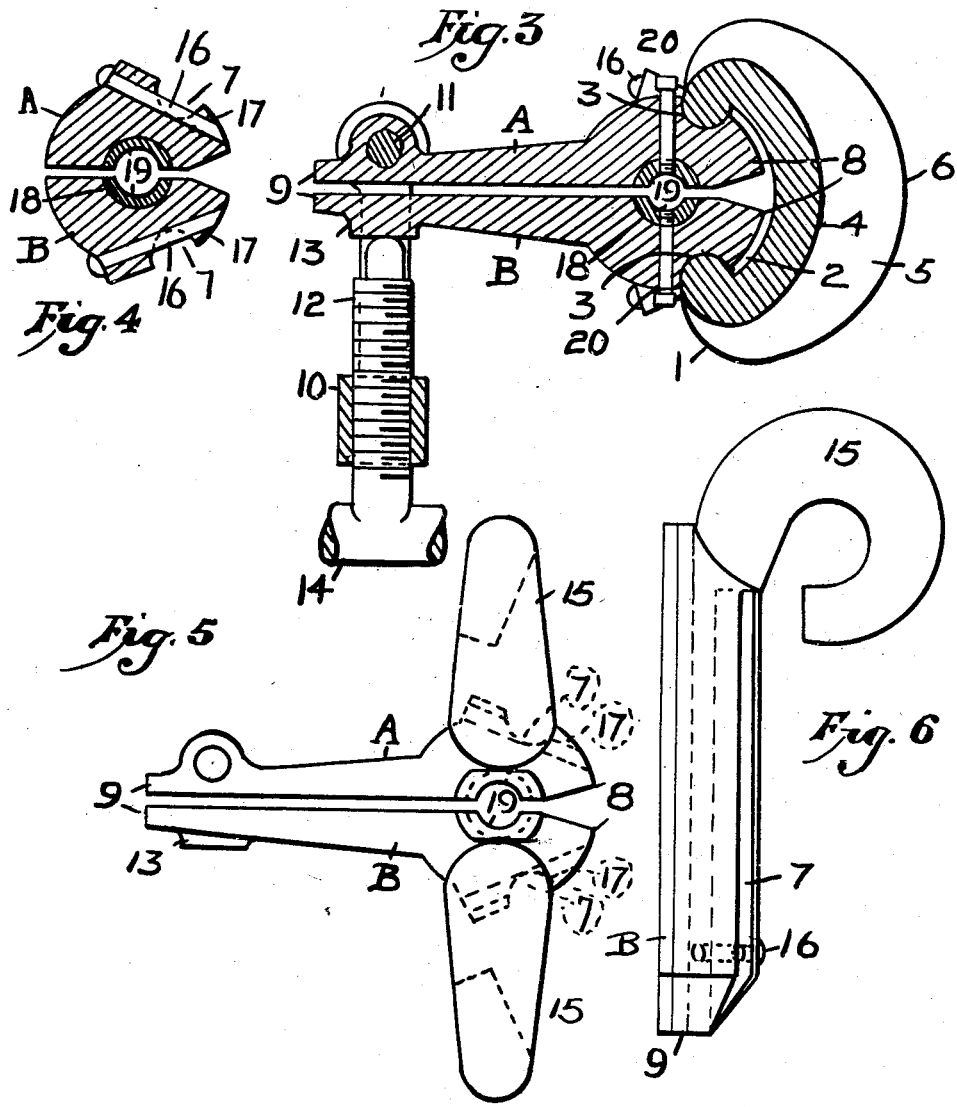

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

WIRE-ROPE CLAMP.

1,251,723.

Specification of Letters Patent.

Patented Jan. 1, 1918.

Application filed April 27, 1917. Serial No. 164,872.

*To all whom it may concern:*

Be it known that I, CLYDE S. WRIGHT, a citizen of the United States, residing at Toledo, in the county of Lucas and State of Ohio, have invented new and useful Improvements in Wire-Rope Clamps, of which the following is a specification.

My invention relates to clamps for wire ropes or cables, particularly those used for well-drilling.

It is the object of this invention to provide a wire rope or cable clamp which is simple in its construction and capable of operation in both the closing and opening directions with a minimum of friction without a loss in clamping power.

Figure 1:
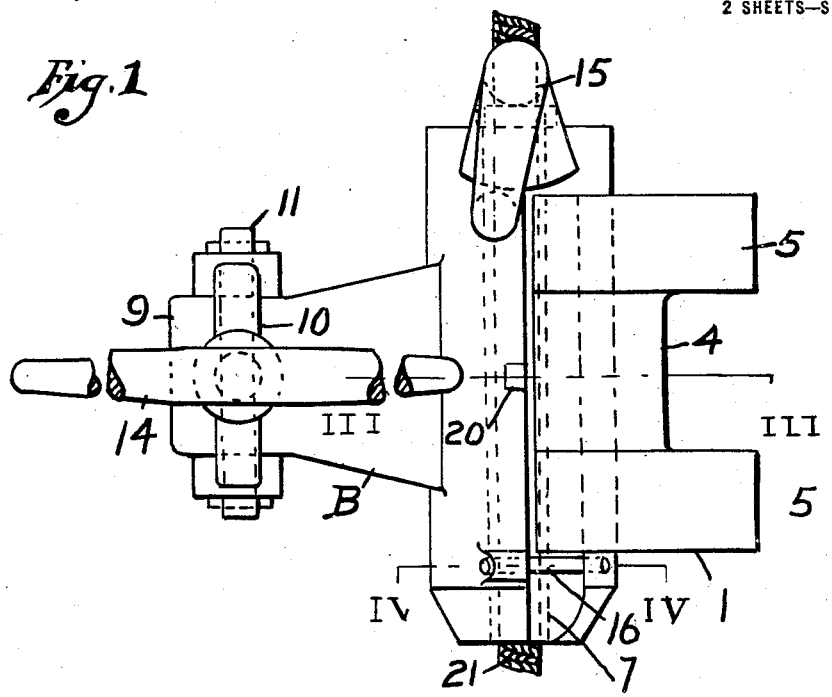
Figure 2:
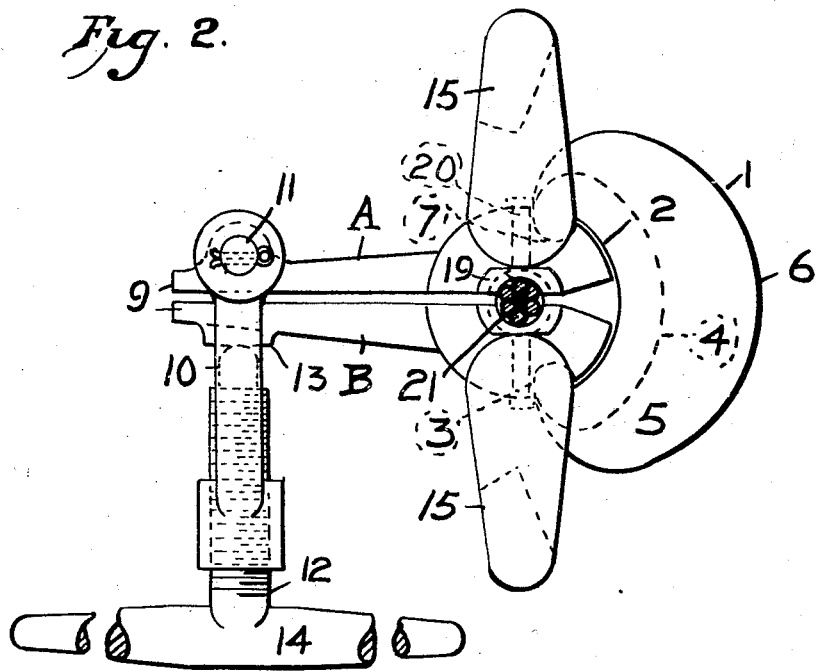

Referring to the accompanying drawings, Figure 1 is a side elevation of a wire rope clamp embodying my invention; Fig. 2, a plan thereof; Fig. 3, a section on the line III—III, Fig. 1; Fig. 4, a section on the line IV—IV, Fig. 1; Fig. 5, a plan view of the clamp levers in the normal arrangement; and Fig. 6, an end elevation of one of the said levers.

On the drawings, 1 designates a strong frame or body member composed preferably of steel. It has the vertical channel 2 extending from the top to the bottom thereof, the edges of the channel standing opposite each other and provided with vertical rounded ribs 3 which project inwardly toward each other beyond the adjacent wall of the channel 2. The part of the body on the opposite edge of the channel from the ribs 3 is made thick horizontally, the central portion 4 being a web connecting the end portions which are widened out to form the flanges 5 which become wider and wider from the said ribs 3 toward the central portion 6 thereof.

A and B are the two clamp levers which are substantially alike except that one is right handed and the other left handed. The levers have the vertical grooves 7 which conform to the shape of the ribs 3, which serve as fulcra for the levers. The inner ends 8 of the levers project into the channel 2 and their outer ends 9 extend outwardly in the opposite direction. The lever A is provided with the yoke 10 pivoted on the pin 11, the closed end of the yoke carrying the clamping screw 12 which bears against the lug 13 on the outer face of the lever B. The screw is operated by the cross-handle 14.

The upper ends of the levers are provided with the hooks or eyes 15 which lie over the upper ends of the grooves 7 and form stops or rests lying normally on the upper ends of the ribs 3. The hooks 15 serve for the attachment of the clamp to the usual reins for suspending it from the temper-screws of a well-drilling apparatus.

The body 1 is suspended on the levers and held thereon by the cross-pins 16 which pass through the levers A and B and through the grooves 7 just beneath the body, the openings for receiving the pins being shown at 17 in dotted lines on Fig. 5 and full lines on Fig. 4.

The levers have in their opposing faces and a short distance in front of the ribs 3 the vertical grooves 18 which receive the liners 19 secured therein by the screws 20 in the levers. These liners constitute the gripping surfaces which directly engage and clamp the wire-rope or cable 21 to the clamp.

The levers are assembled on the body by lowering them with the grooves and ribs registering until the levers are supported by the upper ends of the ribs. Then the pins 16 are inserted in the openings 17. The width of the levers between the ribs and the depth of the grooves is such that neither lever can be removed from the body by any horizontal movements.

It is seen that the center of the wire rope 21 is very close to the line connecting the ribs 3 whereby a very powerful grip is obtained on the rope when the levers are brought toward each other by the screw 12. The liners are separate from the hooks so that they may be replaced without renewing the hooks. The hooks are placed on the levers which simplifies the manufacture and construction of the body and makes the suspension points in line with the rope without extending the body over the levers.

I claim—

1. In a rope clamp, a body having a channel with opposing edges, a pair of levers fulcrumed on the said edges, opposing rope-gripping surfaces close to a line joining the said edges but external to the channel, and means for moving the outer ends of the levers one toward the other.

2. In a rope clamp, a body having a channel with opposing edges, a pair of levers fulcrumed on the said edges by a rib and groove connection, pins in the levers and extending into the groove to support the body, opposing rope-gripping surfaces on the levers, means for suspending the clamp, and means for operating the levers.

3. In a rope clamp, a body having a channel with opposing edges, a pair of levers fulcrumed on the said edges, means on the levers for suspending the clamp, means for supporting the body on the levers, opposing rope-gripping surfaces close to a line joining the said edges but external to the channel, and means for moving the outer ends of the levers one toward the other.

4. In a rope clamp, a body having a channel with opposing ribs at the edges thereof, a pair of levers having grooves in which the ribs are seated, means on the levers for suspending the same, pins insertible in the levers, across the grooves and beneath the body to support the latter, opposing rope-gripping surfaces close to a line joining the ribs but external to the channel, and means for moving the outer ends of the levers one toward the other.

Signed at Toledo, Ohio, this 25th day of April, A. D. 1917.

CLYDE S. WRIGHT.

Copies of this patent may be obtained for five cents each, by addressing the "Commissioner of Patents, Washington, D. C."